US012766695B1

(12) United States Patent
Dault

(10) Patent No.: US 12,766,695 B1
(45) Date of Patent: Oct. 20, 2026

(54) MOUNTABLE ATTACHMENT PLATE

(71) Applicant: David P. Dault, Grand Rapids, MI (US)

(72) Inventor: David P. Dault, Grand Rapids, MI (US)

( * ) Notice: Subject to any disclaimer, the term of this patent is extended or adjusted under 35 U.S.C. 154(b) by 308 days.

(21) Appl. No.: 18/443,930

(22) Filed: Feb. 16, 2024

(51) Int. Cl.
*B25B 11/00* (2006.01)
*B25H 1/00* (2006.01)
*B25H 1/08* (2006.01)

(52) U.S. Cl.
CPC ............. *B25H 1/0021* (2013.01); *B25H 1/08* (2013.01)

(58) Field of Classification Search
CPC ........... B25B 11/00; B25B 11/02; B23Q 3/00; B23Q 3/06; B25H 1/0021; B25H 1/08
See application file for complete search history.

(56) References Cited

U.S. PATENT DOCUMENTS

| | | | | |
|---|---|---|---|---|
| 5,931,726 | A * | 8/1999 | Peters | B24B 47/203 451/305 |
| 9,186,777 | B2 * | 11/2015 | Woods | B25B 5/04 |
| 11,554,464 | B2 * | 1/2023 | Chepurny | B25B 5/163 |
| 12,220,739 | B2 * | 2/2025 | Stuart | B21D 5/0281 |
| 12,330,255 | B2 * | 6/2025 | DeMaio | B23Q 3/102 |
| 2010/0140860 | A1 * | 6/2010 | Gao | B62D 65/10 269/311 |
| 2013/0106042 | A1 * | 5/2013 | Gao | B62D 65/026 269/289 R |

* cited by examiner

*Primary Examiner* — Lee D Wilson
(74) *Attorney, Agent, or Firm* — Gardner, Linn, Burkhart & Ondersma LLP

(57) ABSTRACT

A plate includes an attachment portion located at or near a first surface of the plate, and that includes an attachment feature, such as a threaded through hole, to which an object, such as a tool, may be secured. A securing portion is located at or near a second surface of the plate, and includes a securing feature extending away from the second surface. The securing feature engages a structure, such as a top of a tool box, to secure the plate to the structure. For example, the plate may be slid along the top of the tool box until portions of the tool box, such as flanges, slide into a receiving space defined at least in part by the securing feature. A securing member, such as a flexible cantilevered beam, may be moved between locked and unlocked positions to further secure or desecure the plate from the tool box.

20 Claims, 11 Drawing Sheets

MOUNTABLE ATTACHMENT PLATE

BACKGROUND AND FIELD OF THE INVENTION

The present invention is directed to a plate that may be secured to a structure, such as a tool box, and to which an article, such as a tool, may be attached.

Tools are routinely used in remote locations on job sites in a wide array of industries. In such settings workers may not have all of the tools available to them as they might at a shop or business, thus increasing the difficulty of providing services or repairs at the remote locations. It is thus desirable to increase the usability of the tools and equipment that are available at such remote job sites.

SUMMARY OF THE INVENTION

The present invention provides a device, such as a plate, board, or panel that is attachable, mountable, and/or securable to a structure, and which also provides various attachment features to which an object, such as a tool, may be secured. In particular, one side of the plate may be secured to a structure, such as a tool box, while the other side of the plate may provide various attachment features for securing objects to the plate. The plate is movable relative to the tool box, such as by sliding the plate relative to the tool box, such that securing features on the plate become engaged with features, such as flanges, on the tool box. A movable member, such as a flexible member or lever, is movable to a locked position to fully engage or secure the plate to the tool box. Optionally, the plate may be more firmly secured to the tool box by one or more adjustable members, such as bolts, that are secured to the plate while also making contact with the tool box. The bolts are adjustable by a user, for example, by threading the bolt through an attachment feature of the plate, to thereby increase the frictional engagement or pressure between the flanges of the tool box and the securing features of the plate, thus reducing the degree of movement possible between the plate and the tool box.

According to one form of the present invention, a plate to which an object may be selectively secured, and that is securable to a structure, includes a first surface located opposite a second surface, and an attachment portion located at or near the first surface. The attachment portion includes an attachment feature to which the object may be secured. A securing portion at or near the second surface includes a securing feature extending away from the second surface. The securing feature may be engaged to the structure to selectively secure the plate to the structure. Optionally, the plate is a unitary body.

In one aspect, the plate is slidable relative to the structure to engage the securing feature to the structure. Optionally, the securing feature includes a shelf spaced from the second surface, where a portion of the structure slides between the shelf and the second surface when the plate is slid relative to the structure. The attachment feature may include a through hole for threadedly receiving a fastener such that a distal end of the fastener extends further away from the second surface than the securing feature. The distal end of the fastener may physically contact the structure to increase the frictional engagement between the shelf and the portion of the structure located between the shelf and the second surface. The securing portion may also include multiple securing features.

In another aspect, the attachment feature includes a threaded through hole. Optionally, the attachment feature includes a cavity underlying the first surface for receiving and holding a threaded nut, where a fastener is insertable through the through hole to threadedly engage the nut. The plate may include multiple attachment features, where the attachment features may be hexagonal-shaped and include outer walls extending to the second surface to form a hexagonal grid at the second surface.

In yet another aspect, a securing member is movable relative to the first surface between a locked position and an unlocked position. The securing member includes a tab that engages the structure when the securing member is in the locked position to secure the plate to the structure. The tab is disengaged from the structure when the securing member is in the unlocked position to release the plate from the structure. The securing member may include a proximal end connected at or near the first surface or the second surface, and a distal end terminating at or inboard of an outer perimeter of the first surface or the second surface. Optionally, the securing member includes a handle portion at the distal end, where the handle portion is curved to define an access cavity for receiving one or more human fingers to allow the one or more human fingers to flex the securing member into the unlocked position. The securing member may be a resilient cantilevered member that is flexible between the locked and unlocked positions.

According to another form of the present invention, a plate to which an object may be selectively secured, and that is securable to a structure, includes a first surface located opposite a second surface, and an attachment portion located at or near the first surface. The attachment portion includes multiple attachment features to which the object may be secured. A securing portion located at or near the second surface includes multiple securing features that may be engaged with the structure to selectively secure the plate to the structure.

In one aspect, the securing features each include a shelf spaced from the second surface, such that when the plate is slid relative to the structure, portions of the structure slide between the shelves and the second surface to engage the securing features to the structure.

In another aspect, the attachment features have a through hole, and a cavity underlying the first surface, where the cavities may receive and frictionally engage a threaded nut. A fastener is insertable through any one of the through holes to threadedly engage a respective nut.

In yet another aspect, the through holes may threadedly receive a fastener such that a distal end of the fastener extends further away from the second surface than the securing features. The distal end of the fastener physically contacts the structure to thereby increase the frictional engagement between the shelves and the portions of the structure located between the shelves and the second surface.

According to another form of the present invention, a plate to which an object may be selectively secured, and that is securable to a structure, includes a first surface located opposite a second surface, and an attachment portion at or near the first surface. The attachment portion includes multiple attachment features to which the object may be selectively secured. A securing portion at or near the second surface includes multiple securing features that may selectively secure the plate to the structure. A securing member is movable relative to the first surface between a locked position and an unlocked position. The securing member has a tab that engages the structure when the securing member is in the locked position to secure the plate to the structure.

The tab is disengaged from the structure when the securing member is in the unlocked position to release the plate from the structure.

In one aspect, the attachment features include hexagonal-shaped cavities having outer walls that extend to the second surface to form a hexagonal grid at the second surface.

These and other objects, advantages, purposes and features of this invention will become apparent upon review of the following specification in conjunction with the drawings.

DESCRIPTION OF THE PREFERRED EMBODIMENTS

Figure 1A:
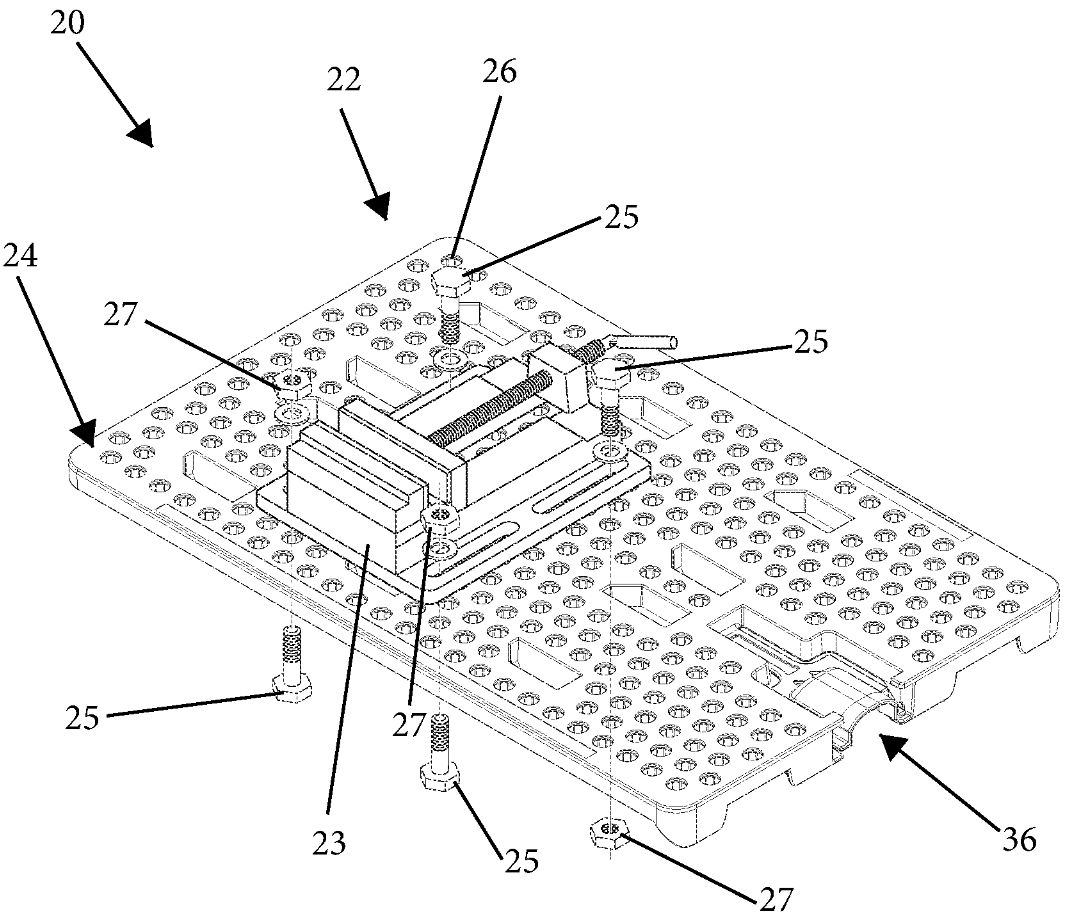
FIG. 1A is a perspective view of a mountable attachment plate in accordance with the present invention, where a vise is shown secured to the attachment plate.
Figure 1B:
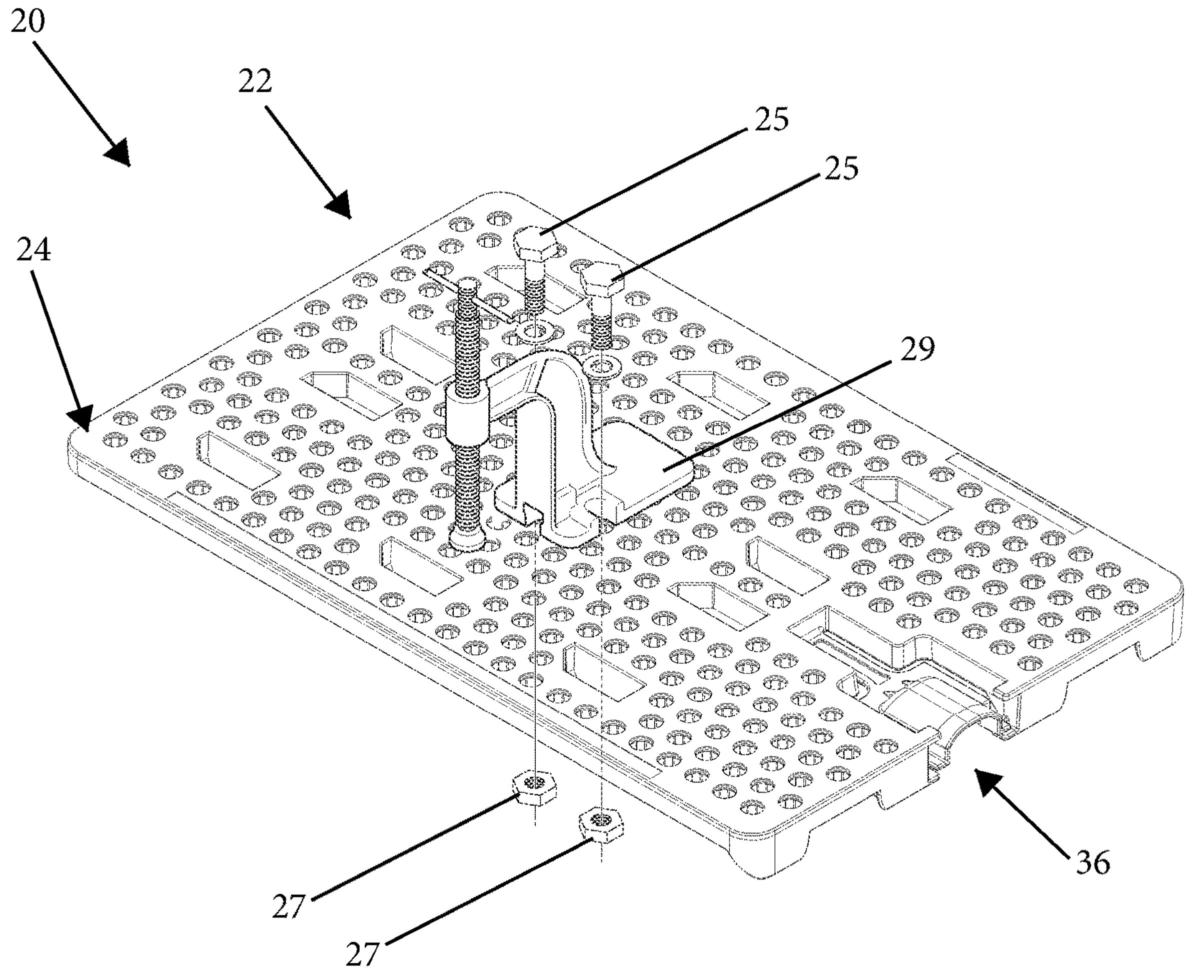
FIG. 1B is a perspective view of the attachment plate of FIG. 1A, where a clamp is shown secured to the attachment plate.
Figure 2:
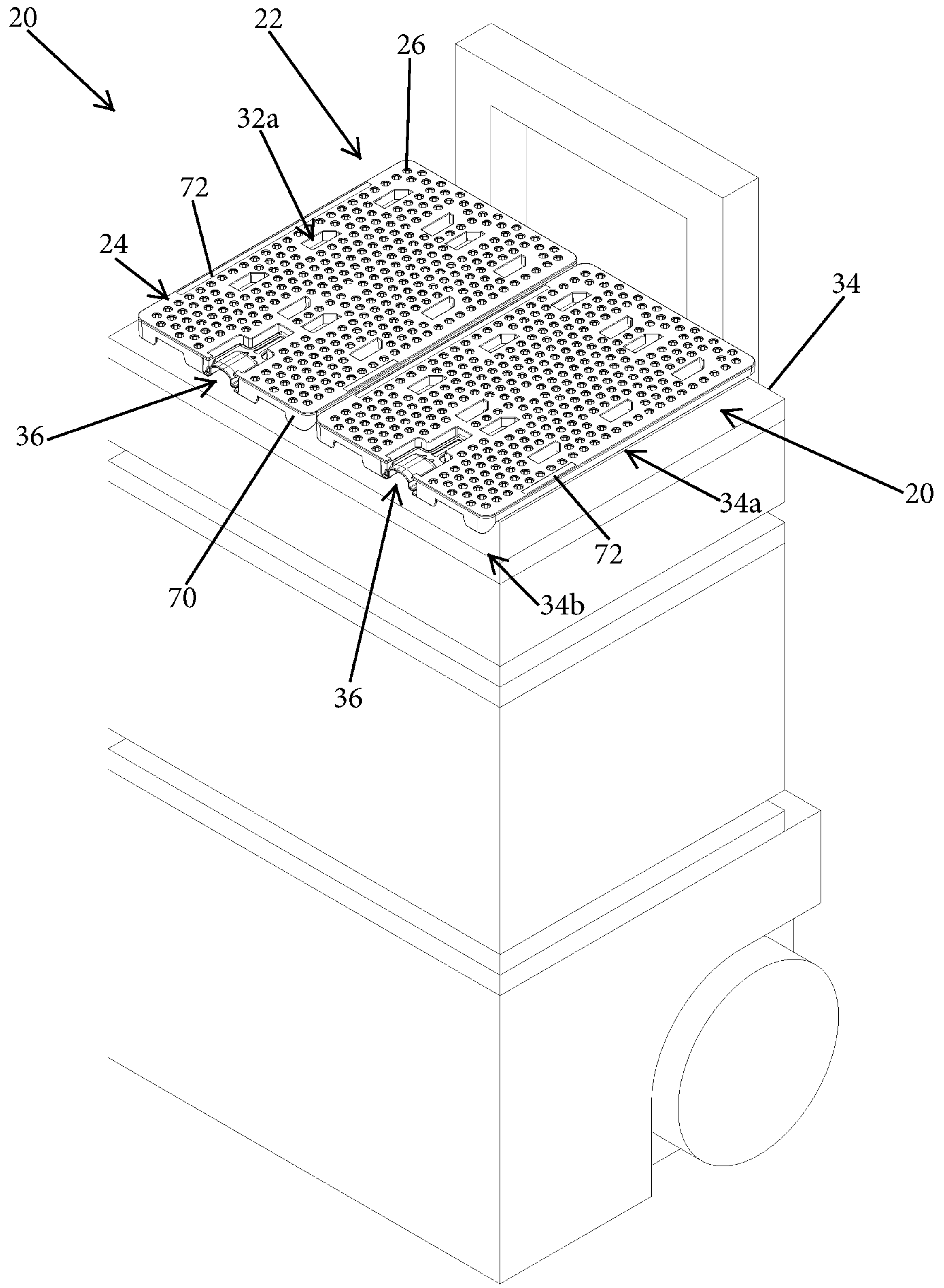
FIG. 2 is a perspective view of the attachment plate of FIG. 1A, where the attachment plate is shown mounted to a top of a portable tool box.
Figure 3:
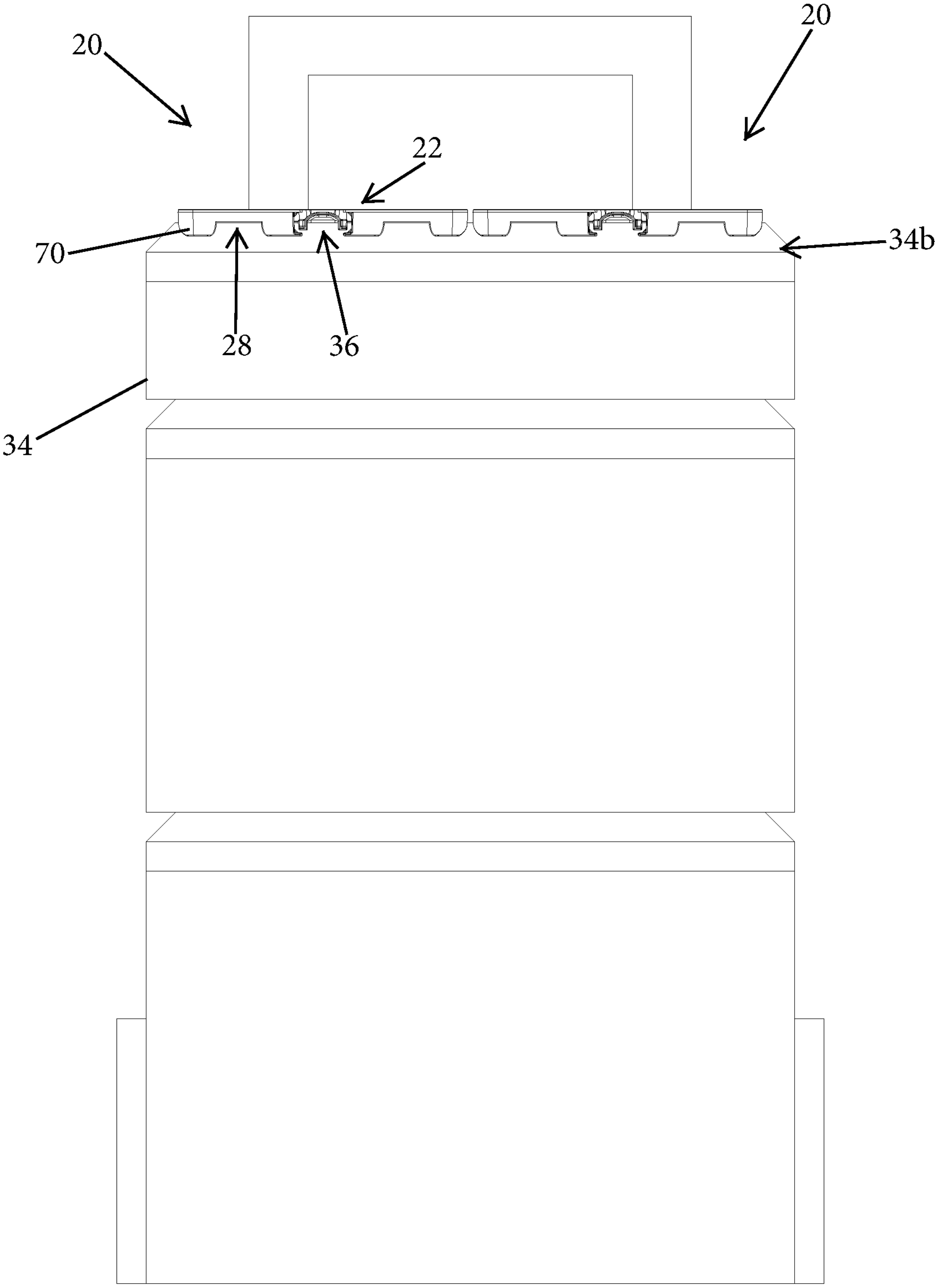
FIG. 3 is a front elevation view of the attachment plate of FIG. 2.
Figure 4:
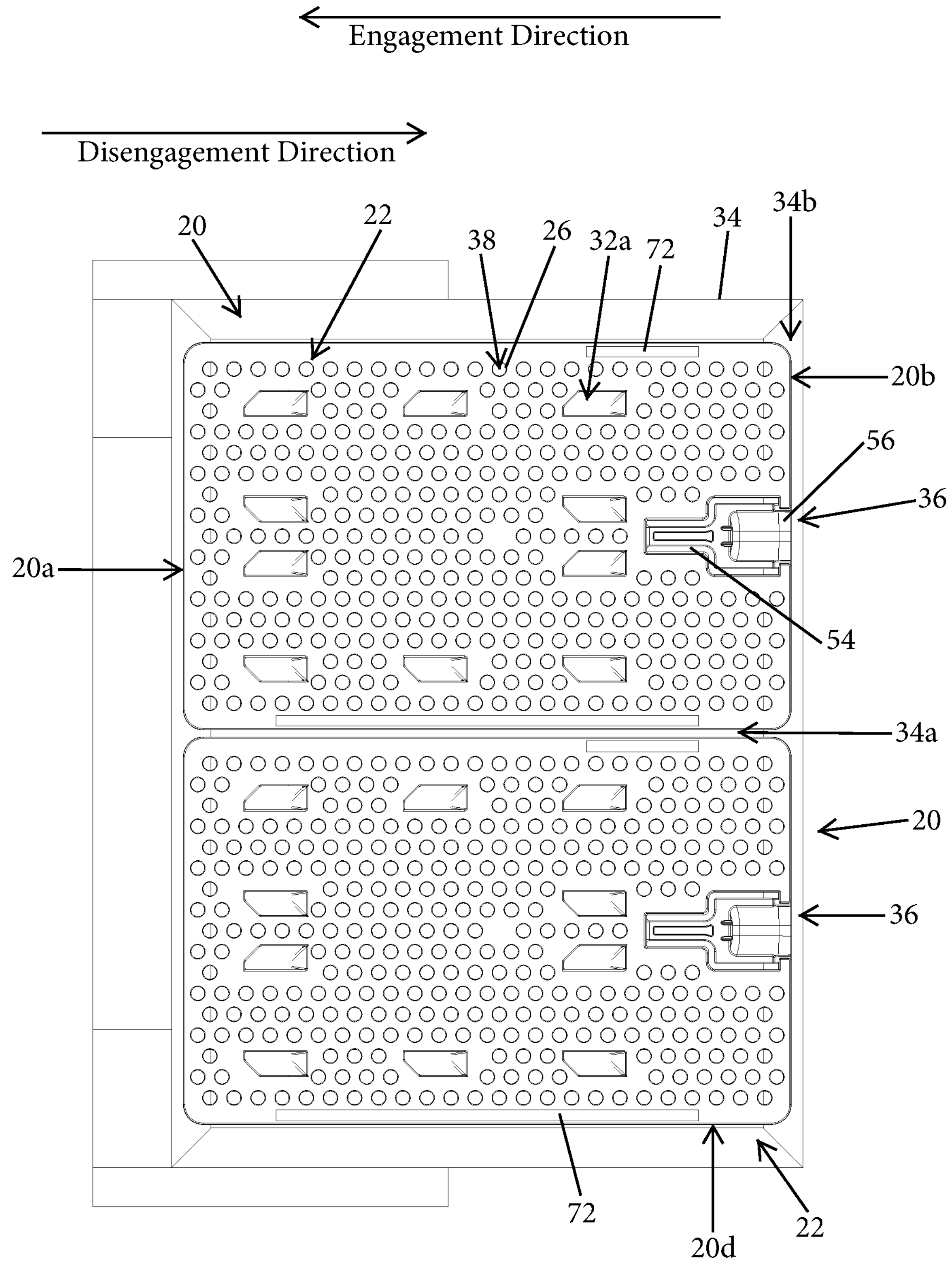
FIG. 4 is a top plan view of the attachment plate of FIG. 2.

The present invention will now be described with reference to the accompanying figures, wherein the numbered elements in the following written description correspond to like-numbered elements in the figures. With reference to FIGS. 1A-5 and 8, an attachable, securable, or mountable structure, which may take the form of a substantially planar structure, or a structure having substantially planar surface portions, such as a panel or plate 20, includes an attachment portion 22 located at and/or near a first surface or upper surface 24. Attachment portion 22 defines a series of attachment features in the form of mounting apertures or holes 26 to or at which an article, such as a vise 23 (FIG. 1A), a clamp 29 (FIG. 1B), or other tool(s) and/or objects may be secured. A securing portion 28 is at and/or near a second surface or lower surface 30 located opposite upper surface 24, and includes a series of securing features or projections or protrusions in the form of legs 32 that are securable to a structure, such to the top of a tool box 34. In the illustrated embodiment, plate 20 includes a securing or locking member in the form of a locking lever 36 that may be flexed between a locked position and an unlocked positon. In the locked position, lever 36 is secured to tool box 34 to further secure plate 20 to tool box 34 and/or further restrict the movement of plate 20 relative to tool box 34, while in the unlocked position lever 36 is unsecured from tool box 34 such that plate 20 may be movable relative to tool box 34. Thus, plate 20 may be selectively secured to tool box 34 to provide a structure and work surface for securing articles, such as vise 23, and/or working on articles, such as a wooden board. Accordingly, plate 20 offers additional functionality to a person that may, for example, be working on a home improvement project, construction project, or other tasks that may involve the use of tools, in and around toolbox 34 or other structure that plate 20 may be secured to.

As will be more fully described below, a user of plate 20 may secure plate 20 to tool box 34 by sliding plate 20 along an upper surface 34*a* of tool box 34 in a direction extending from a forward wall 20*b* of plate 20 to a rear wall 20*a* of plate 20, or an engagement direction (FIG. 4), such that a receiving space 46 (FIGS. 10 and 11) receives flanges or projections or tabs of tool box 34 to thus at least partially limit the movement of plate 20 relative to tool box 34. In particular, once plate 20 is secured in this fashion, the movement of plate 20 relative to tool box 34 is limited to only the engagement direction and a disengagement direction opposite the engagement direction, or a direction extending from rear wall 20*a* to forward wall 20*b*. To secure or retain plate 20 to tool box 34, or to prevent movement of plate 20 relative to tool box 34 in either the engagement or disengagement directions, locking level 36 may be actuated into the locked position where a tab 58 (FIGS. 8 and 12) becomes frictionally engaged with and/or received by or in a cavity or slot of tool box 34, where in the illustrated embodiment lever 36 is biased downwardly in a cantilevered manner. Due to the resilient and/or flexible characteristics of lever 36 described further below, lever 36 may be biased to automatically move into the locked position as plate 20 is slid along tool box 34.

A user may then use one or more adjustable members such as a bolt 25 (FIG. 1A) or other fastener to more firmly secure plate 20 to tool box 34. In particular, one or more bolts 25 may be threaded into a nut 27 disposed on the opposite side of plate 30 at mounting holes 26, where bolt 25 can be threaded such that a distal end of bolt 25 extends downward to make contact with upper surface 34*a* of tool box 34. The user can continue to thread bolt 25 such that plate 20 is pushed upward away from tool box 34 while still being secured to tool box 34, thereby causing increased frictional engagement between the flanges of tool box 34 and legs 32 to tighten or reduce "play" or the amount of movement that can occur between plate 20 and tool box 34. As shown in FIG. 1A, one or more bolts 25 may also be inserted upward through plate 20, for example, such that a distal end of bolt 25 extends upward through a slot of vise 23 where bolt 25 is threaded to a nut 27 to thereby couple vise 23 to plate 20.

Figure 7:
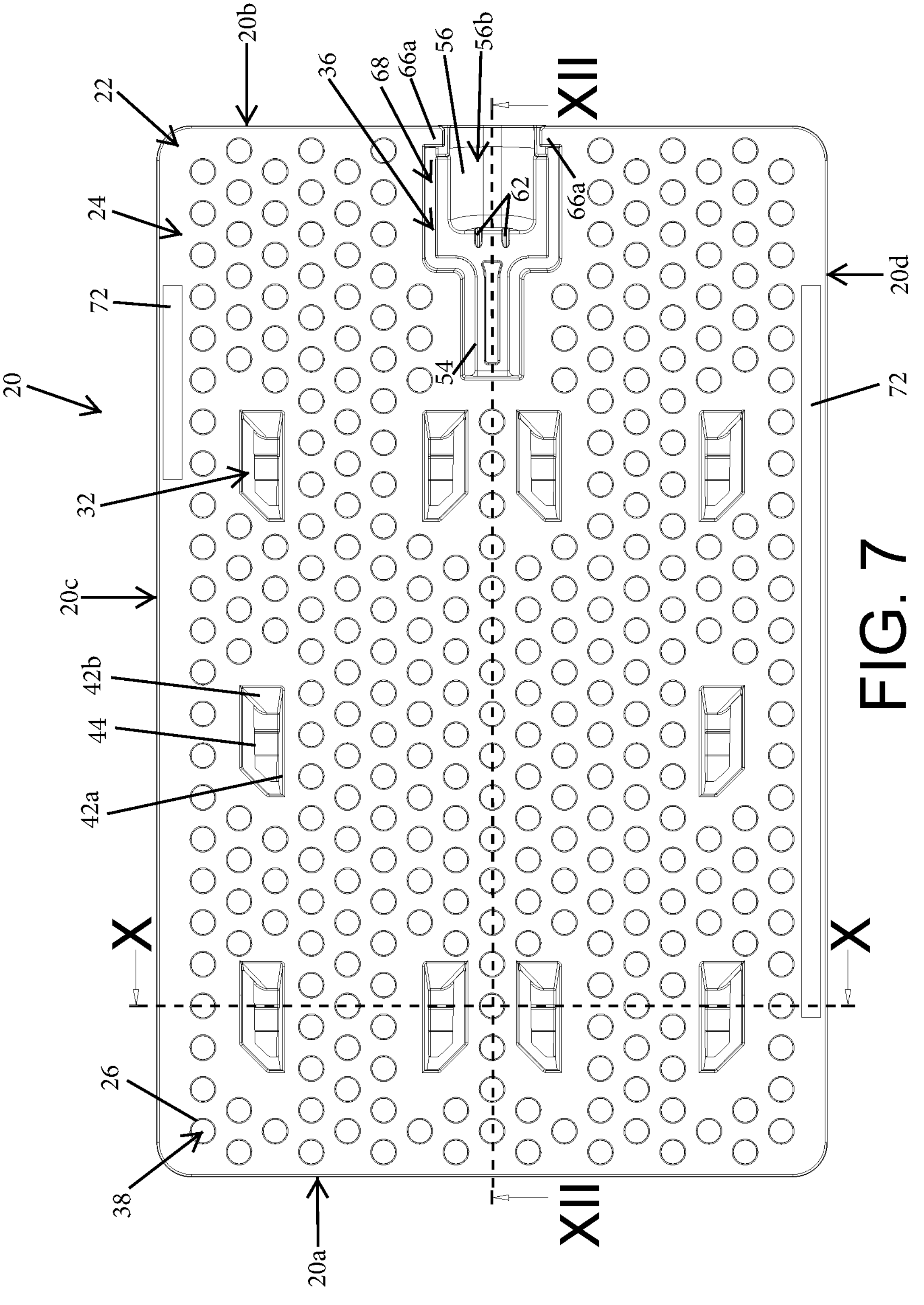
FIG. 7 is a top plan view of the attachment plate of FIG. 6.

As previously noted, plate 20 includes upper surface 24 located opposite lower surface 30, where upper and lower surfaces generally encompass a planar area located and extending between outer side walls of plate 20. In the illustrated embodiment, upper surface 24 is located at or above all other features of plate 20 (when viewed from FIG. 11) to provide an unobstructed area where tasks may be performed, such as cutting a piece of wood. Plate 20 has a first end that includes a first wall or rear wall 20*a* located opposite a second end having a second wall or forward wall 20*b*. (FIG. 7). Extending between rear wall 20*a* and forward wall 20*b* are a pair of opposing side walls 20*c* and 20*d*. Outer side walls 20*a-d* extend between upper surface 24 and lower surface 30 of plate 20 to provide additional strength, stability, and rigidity to plate 20, and collectively define an outer boundary or perimeter of plate 20, as well as upper and lower surfaces 24 and 30. Indentations or depressions in the form of gripping elements 72 are located near side walls 20*c* and 20*d* to improve the ability of a user to grip plate 20, for example, when sliding plate 20 to secure or release plate 20 to or from tool box 34. It should be appreciated an alternative plate may have more or less outer walls than what is described above, where the walls could also vary in shape and size such that alternative plates are also variable in overall shape and size. Additionally, a plate may include gripping elements that are further recessed from an upper surface of the plate, such that the gripping elements could also be used for storage areas.

With reference to FIGS. 6-8, 10, and 12, attachment portion 22 includes a number of mounting holes 26 defined through plate 20 from upper surface 24 to lower surface 30. Each mounting hole 26 includes a through hole 38 connected to, or forming a common or interconnected space with, a hexagonal-shaped cavity 40. Through holes 38 are defined by plate 20 from upper surface 24 to cavities 40, while cavities 40 are defined by plate 20 from through holes 38 to lower surface 30. Cavities 40 are shaped and sized to receive and secure a threaded article such as nut 27 (FIG. 1A), or may receive the head of a bolt, such a bolt configured to project upwardly through plate 20. In the illustrated embodiment cavities 40 on the underside of plate 30 have a hexagonally shaped outer wall such that a hexagonally shaped nut 27 or a hexagonal head of a bolt 25 may be received therein and be prevented from rotating. In the illustrated embodiment, nut 27 or head of bolt 25 may be received and secured in any one of cavities 40 via frictional engagement, such as by a press-fit connection. In this way, a user may securely position one or more threaded nuts or bolts in any one or more of cavities 40 as desired in order to allow a threaded member, such as a threaded shaft, bolt, or other fastener, to be inserted through any one of through holes 38 and threaded into the nut at the respective cavity 40 to secure the threaded member to attachment portion 22 or to attached a threaded member to a bolt 25 extending through a respective mounting hole 26. The alignment of the nut in cavity 40 is such that the threaded portion of the nut is substantially aligned with through hole 38, thus effectively forming a threaded through hole through plate 20.

The threaded member could be coupled or connected to a tool, such as vise 23 (FIG. 1A) or clamp 29 (FIG. 1B) where vise 23 and/or clamp 29 may be used to clamp and secure another article to plate 20, such as a board. It should be appreciated that an attachment portion may vary within the scope of the invention, including with regard to the shape, size, and number of attachment features that an attachment portion may include. For example, an attachable plate may include an attachment portion having only one attachment feature, where the attachment feature could also have an alternatively defined geometry relative to mounting holes 26. Furthermore, an attachment portion may include built-in clamping features, magnetic elements, or other alternative attachment features.

Figure 8:
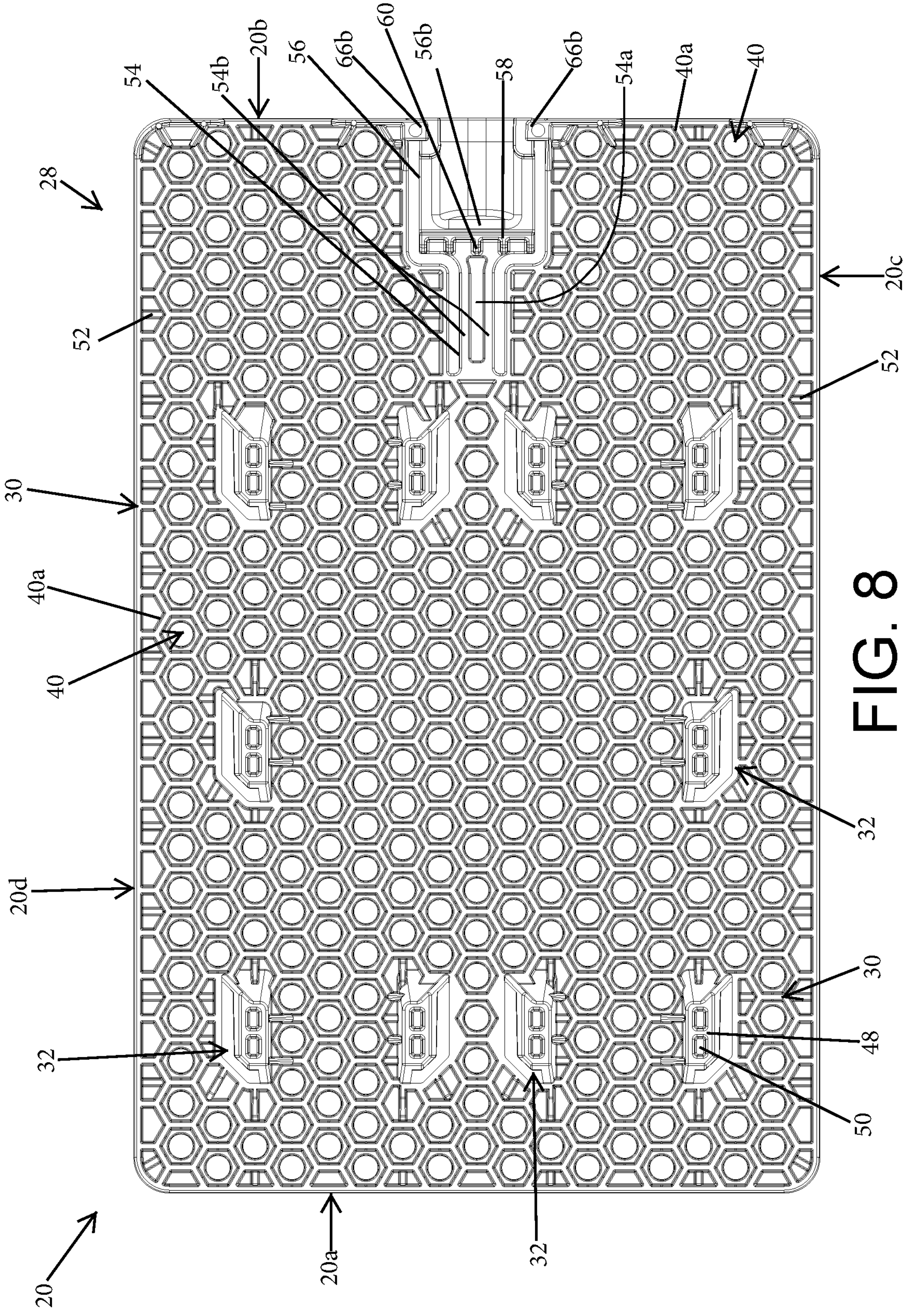
FIG. 8 is a bottom plan view of the attachment plate of FIG. 6.

Each cavity 40 is defined at least in part by outer wall 40*a* that also forms at least a portion of lower surface 30. (FIG. 8). Due to the arrangement of cavities 40 relative to one another, outer walls 40*a* collectively form a honeycomb-shaped pattern or hexagonal grid at lower surface 30. Thus, outer walls 40*a* not only define a portion of cavities 40, but also form a lattice structure or hexagonal mesh that may strengthen and reduce the overall weight of plate 20 as compared to more continuous or solid surface structure.

Figure 9:
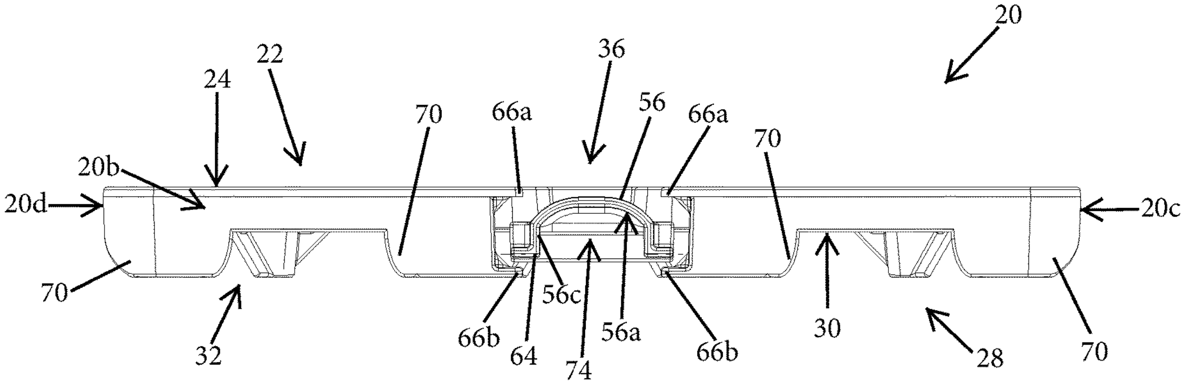
FIG. 9 is a front elevation view of the attachment plate of FIG. 6.
Figure 10:
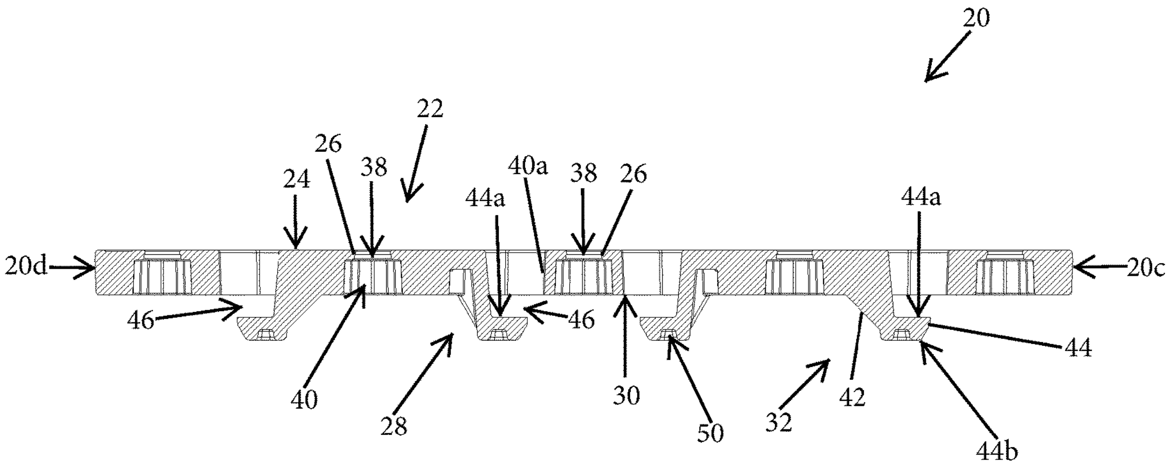
FIG. 10 is a cross sectional elevation view of the attachment plate taken along the line of X-X of FIG. 7.
Figure 11:
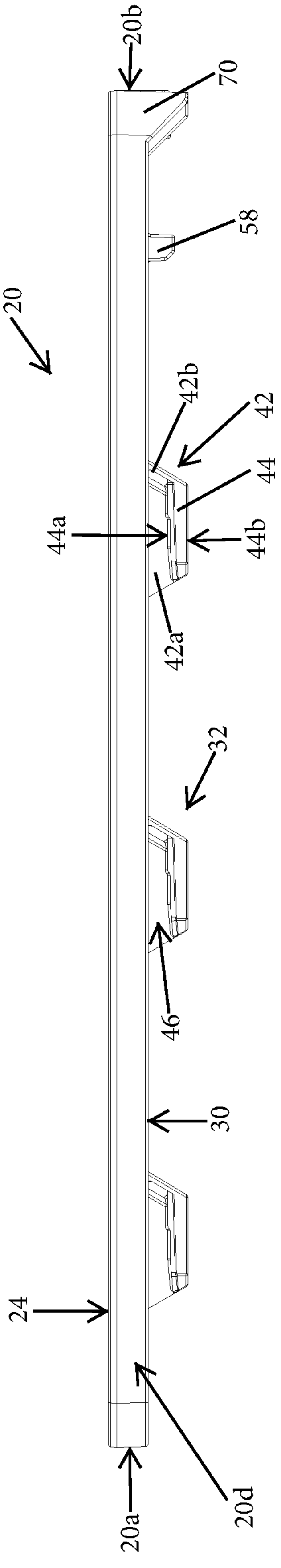
FIG. 11 is side elevation view of the attachment plate of FIG. 6.

With further reference to FIGS. 9-11, legs 32 of securing portion 28 extend outward and/or away from lower surface 30, and include a proximally located extension portion 42 connected to a distal flange, ledge, tab or shelf 44 extending away from extension portion 42 at an angle. Extension portion 42 extends from upper surface 24 downward towards and/or past lower surface 30, and includes a side wall 42*a* connected to a back wall 42*b*, where both side wall 42*a* and back wall 42*b* extend downwardly from lower surface 30 and are connected to shelf 44. As a result, open spaces or leg cavities 32*a* are at least partially defined by and located at upper surface 24, and may be used, for example, to store various items once plate 20 is secured to tool box 34. In the illustrated embodiment, shelf 44 extends away from extension portion 42 such that an upper surface 44*a* of shelf 44 is approximately parallel to lower surface 30. Receiving space 46 is defined between each shelf upper surface 44*a* and a portion of plate lower surface 30 spaced directly above or overlying the respective upper surface 44*a*. As will be explained in further detail, each receiving space 46 is configured to receive a portion of a structure that plate 20 is being secured to, such as the previously noted flanges of tool box 34. A lower surface 44*b* of each shelf 44 includes structural ridges or strengthening ribs 48 defining a pair of spaced cavity or recess 50. (FIG. 8). Additional strengthening ribs 52 are present at bottom surface 30 near and/or around each leg 32, and proximate outer side walls 20*a*-*d*.

Locking lever 36 is integrally formed with plate 20 as a resilient cantilevered beam that is able to be manually flexed between locked and unlocked positions in order to fully secure or release plate 20 from tool box 34. (FIGS. 6-9 and 12). Locking lever 36 includes a proximally located stem 54 connected to plate 20 at or near lower surface 30. A gripping portion in the form of a curved handle 56 is located distal to stem 54, and is shaped and sized to define an access cavity 74 that may receive one or more human fingers at a lower handle surface 56*a* to allow a user to lift handle 56 upward toward upper surface 24, thereby also flexing lever 36 upward towards upper surface 24.

Figure 12:
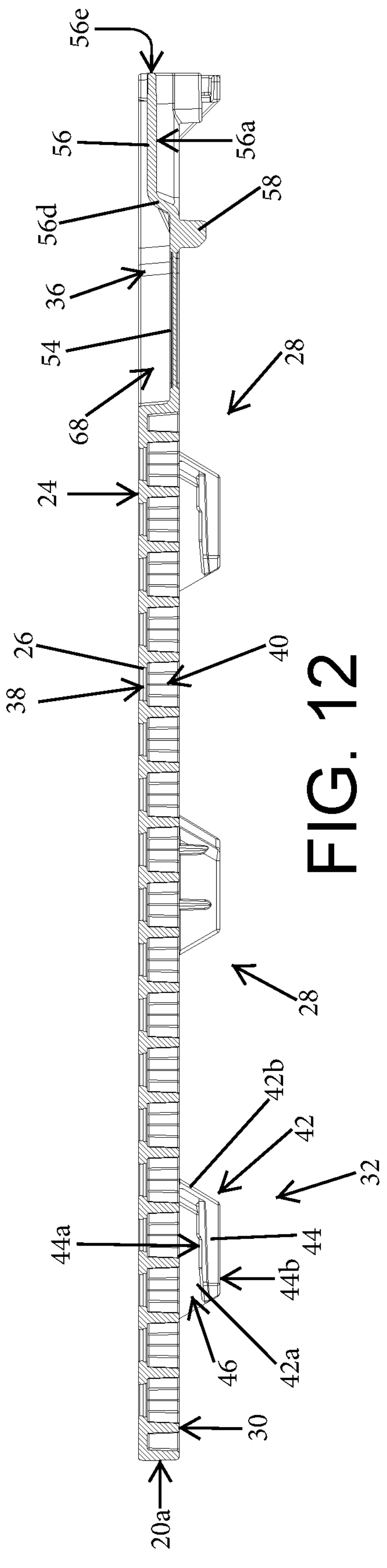
FIG. 12 is a cross sectional elevation view of the attachment plate taken along the line of XII-XII of FIG. 7.

In particular, handle 56 includes a middle curved portion 56*b* extending between a pair of opposed handle sidewalls 56*c* and a back wall 56*d*, where an outboard end 56*e* of handle 56 is open (FIGS. 6 and 8) to allow the user to insert their fingers therethrough. A retention feature or protrusion in the form of tab 58 extends downwardly from lever 36, or a direction away from upper surface 24, and is configured to be received by a slot on tool box 34 while lever 36 is in the locked position. A series of supportive protrusions 60 connected to and between tab 58 and lever 36 provide additional strength and stability to tab 58 (FIGS. 8 and 12), while another pair of protrusions 62 are connected between curved portion 56*b* and lever 36 to provide additional strength and stability to handle 56 (FIGS. 7 and 12). A central or middle recessed portion 54*a* is defined by stem 54 and has a smaller cross sectional area than adjacent outboard stem portions 54*b*. Thus, recessed portion 54*a* provides stem 54 with greater flexibility, while outboard stem portions 54*b* add strength and support to stem 54.

Figure 6:
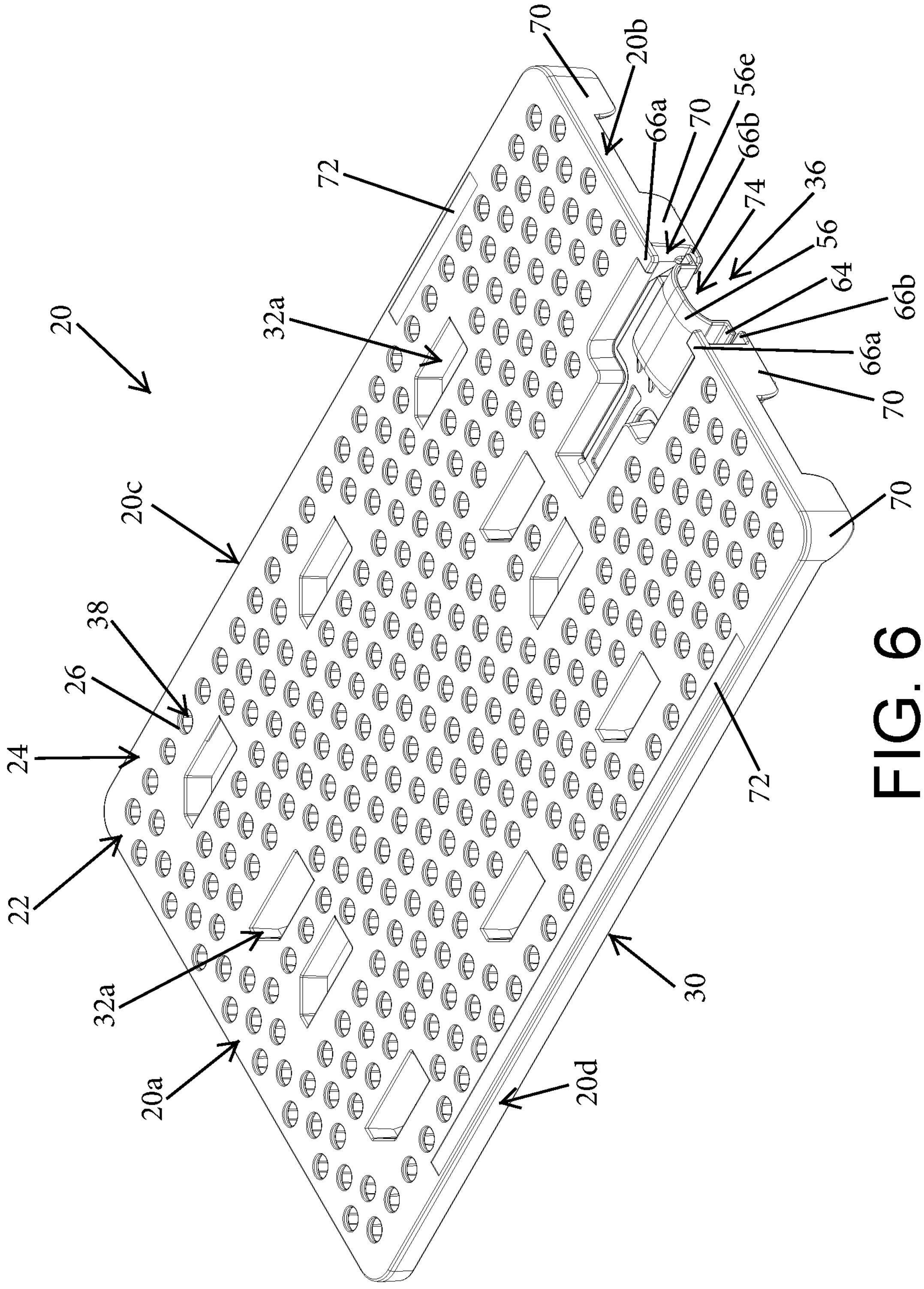
FIG. 6 is another perspective view of the attachment plate of FIG. 1A, where the vise is not secured to the attachment plate.

With reference to FIGS. 6 and 9, handle 56 includes a pair of flanges 64 that project outwardly, and that are located between flanges or hard stops 66*a* and 66*b*, where upper hard stops 66*a* are located at upper surface 24, and lower hard stops 66*b* are located at lower surface 30. Hard stops 66*a* and 66*b* extend inwardly from respective upper and lower surfaces 24 and 30 towards handle 56, where upper hard stops 66*a* directly overlie flanges 64, and lower hard stops 66*b* directly underlie flanges 64. Thus, as lever 36 is actuated or flexed upwardly and downwardly, or between locked and unlocked positions, the allowable motion of lever 36 is limited by flanges 64 coming into contact with either upper or lower hard stops 66*a* or 66*b*.

With particular reference to FIGS. 6-8, the above described structure of lever 36 is configured to fit at or within or inboard of the perimeter of outer walls 20*a-d* of plate 20 to thus provide plate 20 with a compact configuration, which in the illustrated embodiment is substantially rectangular in shape. Accordingly, plate 20—at and/or within the boundary of outer sides 20*a-d*—at least partially defines a lever space 68 that accommodates the spatial requirements of lever 36. Lever space 68 is defined to substantially mirror or match the outer geometry of lever 36 while also providing space for lever 36 to be flexed to lock and unlock lever 36 from tool box 34.

Figure 5:
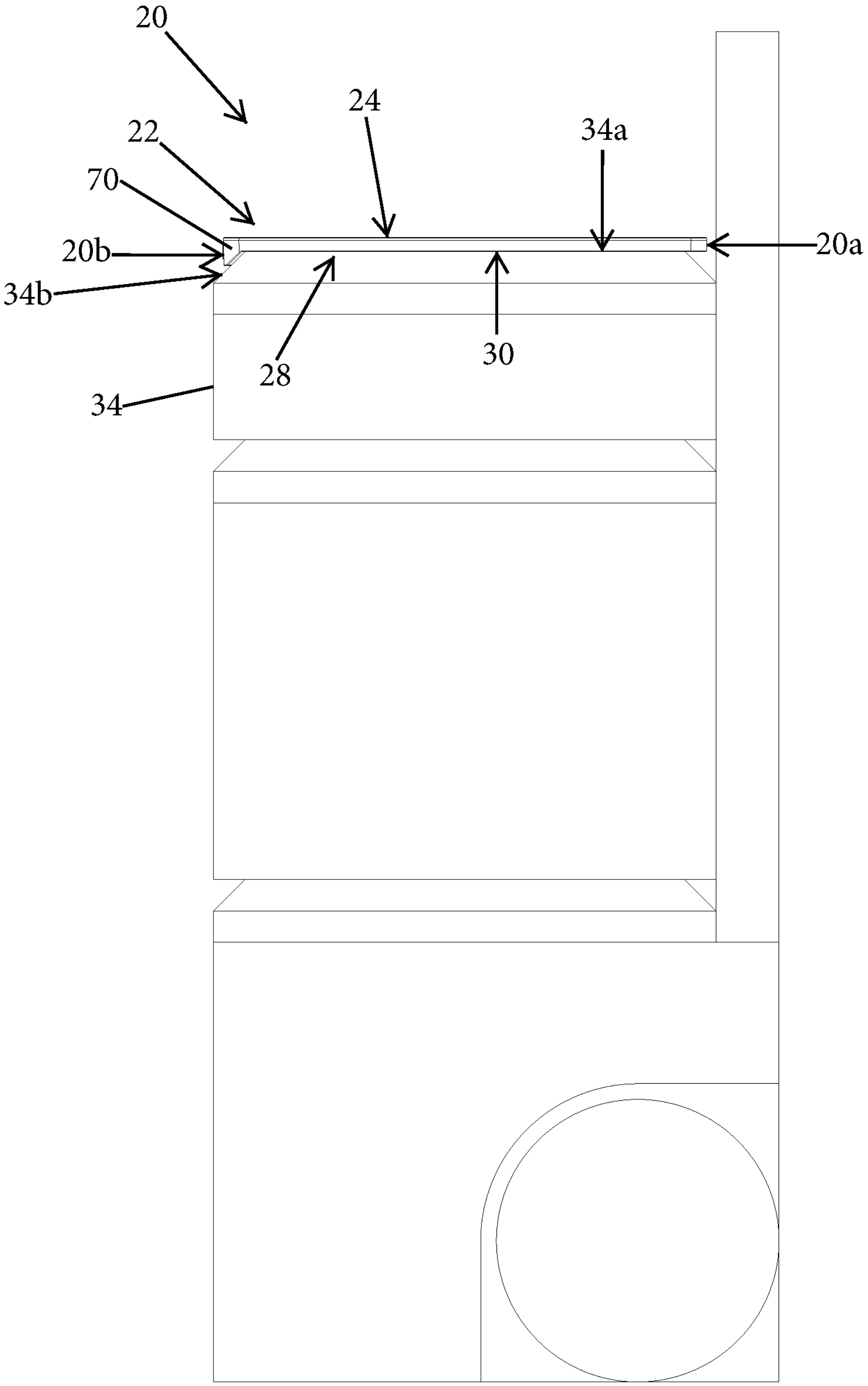
FIG. 5 is a side elevation view of the attachment plate of FIG. 2.

A number of protrusions, supports, or outer legs 70 extend downwardly, or in a direction from upper surface 24 towards and past lower surface 30, at and near outer side 20*b*. (FIGS. 6, 8, 9, and 11). With further reference to FIG. 5, outer legs 70 extend in a downward direction past upper surface 34*a* of tool box 34, and overlie and/or make contact with an angled surface or beveled portion 34*b* of tool box 34. Thus, outer legs 70 provide additional support to plate 20 when plate 20 is secured to tool box 34, and in particular, provide additional support to a portion of plate 20 located at or above beveled portion 34*b* of tool box 34. It should be appreciated that an alternative attachable plate within the scope of the present invention may not include supportive features at or near an outer wall, such as the above-discussed outer legs 70, or may include additional and/or alternative supportive features or legs.

The above-discussed features of plate 20 enable a user of plate 20 to quickly and conveniently secure plate 20 to tool box 34, or another structure, to provide additional functionality to a work area. Initially, the user may move and/or slide plate 20 relative to tool box 34 in the engagement direction. (FIG. 4) As plate 20 is slid in the engagement direction, the flanges of tool box 34 slide into respective receiving spaces 46 defined at least in part by legs 32 and lower surface 30. Back walls 42*b* of legs 32 may come into contact with the flanges of tool box 34 to act as a hard stop and prevent further movement of plate 20 in the engagement direction. Locking lever 36—which may be biased toward the locked position or in a direction towards tool box 34—may automatically move and/or flex into the locked positon such that tab 38 becomes engaged with a slot or other feature defined by tool box 34. Once lever 36 is in the locked position, plate 20 will no longer be slidable relative to tool box 34. At this point, the user may thread an adjustable member, such as bolt 25 (FIG. 1A), into mounting holes 36, where bolt 25 threadedly engages nut 27 secured in one of cavities 40. The user may continue to thread/adjust bolt 25 as desired until bolt 25 makes contact with tool box 34 to push plate 20 upward away from tool box 34 by a desired extent in order to compress together or increase the frictional engagement between the flanges of tool box 34 and at least shelves 44.

In this position, plate 20 is fully secured to tool box 34, and is usable for attaching various items to attachment portion 22 while also providing a work surface at upper surface 24. For example, a clamping device such as vise 23 and/or clamp 29 could be secured to attachment portion 22, where vise 23 and/or clamp 29 may then be used to clamp an object, such as a wooden board, to or near upper surface 24. The user may then drill, cut, mark, etc., the board as desired without the board inadvertently slipping or moving. It should be appreciated that many different tools and other objects could also be secured to attachment portion 22 as desired by a user. If desired, the user may secure multiple plates 20 to a tool box, such as is shown in FIGS. 2-5.

To remove plate 20 from tool box 34, the user may first unscrew bolt(s) 25 (or adjust the adjustable members) used for tightening the flanges of tool box 34 and shelves 44 together from mounting holes 26. The user may then lift and/or flex locking lever 36 to the unlocked position to remove tab 38 from the slot of tool box 34. Finally, the user may simply slide plate 20 in the disengagement direction until legs 32 are disengaged from the flanges of tool box 34 to remove plate 20 from tool box 34.

Plate 20 may be formed of various materials, including one or more plastics and/or various types of metals, such as aluminum and/or steel. In the illustrated embodiment, plate 20 is formed from plastic via a 3-diemensional (3D) printing process as a single unitary body. As such, plate 20 may be produced in an efficient and consistent manner, and may be less prone to wear and tear that can be caused by the movement of parts relative to one another.

It should be appreciated that an attachable plate may include attachment features that vary in size, shape, and arrangement apart from what has been described herein. For example, an attachment feature could include threaded through holes having threaded defined by a plate instead of a nut secured in a cavity, or could include one or more protrusions that extend upwardly and away from an upper surface of a plate to provide a location above the upper surface at which an article may be secured. It should also be appreciated that an alternative attachable plate may not include a locking lever in accordance with the present invention, or may include a locking lever that varies apart from what has been described herein. For example, an alternative locking lever may be pivotably attached to an attachable plate via a pin such that the lever is rotatable about the axis of the pin. Another locking lever may include a slidable component that is slid between a locked position and an unlocked position, or may include a magnet that interacts with a ferrous component on a structure to engage the structure.

Furthermore, it should be appreciated that a plate may include securing features that vary in size, shape, location, characteristics, and number apart from what is described herein, and that these characteristics may be determined at least in part based on the structure that an attachable plate is designed to be secured to. For example, legs 32 of plate 20 are sized, shaped, and positioned to accommodate, mate with, or cooperate with the flanges of tool box 34, where tool box 34 may be or resemble a MILWAUKEE® brand tool box. However, an alternative plate could include securing features designed to cooperate with other tool boxes, such as a DEWALT®, or a CRAFTSMAN®, or a FLEX®, or a RYOBI®, or a RIGID®, or a HUSKY®, or a STANLEY® brand tool boxes, for example, or other such brands of tool boxes or other work surfaces. Therefore, an alternative plate may have a securing portion with securing features in the form of magnets, clamping devices, and/or features, in which the features may also be recessed inward from a lower surface of the plate, or between the lower surface and an upper surface of the plate. Furthermore, securing features could be adjustable in various ways such that the securing features are able to be secured to more than one type of tool box or other structure. Securing features could alternatively become coupled to a structure via a press fit connection, a threaded connection, a hook and loop connection, and/or a combination thereof, and could be actuated in various ways relative to a plate to become engaged with a structure. For example, a securing feature may be rotated or slid relative to an attachable plate and into engagement with a portion of a structure.

Accordingly, an attachable plate 20 provides an adaptable work surface to which various items may be secured, where plate 20 itself may also be quickly and easily secured to a structure or surface, such as the top of a tool box 34. An attachment portion 22 at or near an upper surface 24 includes various mounting holes 26 to which tools or other objects may be secured. A securing portion 28 at or near a lower surface 30 includes legs 32 that may receive flanges of tool box 34 to at least partially secure plate 20 to tool box 34. A locking lever 36 may be actuated to a locked positon to fully secure plate 20 to tool box 34. An adjustable component, such as a bolt that may be threaded into and through mounting holes 26, may be used to contact tool box 34 in order to push plate 20 away from tool box 34 to thereby tighten the connection or interface between legs 32 and the flanges of tool box 34. Thus, plate 20 may be used to supplement or increase the functionality of a surface of a structure, for example, by providing a plurality of locations to which objects may be secured, while also providing a substantially planar work surface area or upper surface 24.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A plate to which an object may be selectively secured, and with the plate configured to be selectively secured to an upper portion of a storage container, and with said plate comprising:

- a first surface comprising an upper surface located opposite a second surface comprising a lower surface;
- an attachment feature proximate said first surface for selectively securing the object to said plate; and
- a securing projection extending from said second surface and comprising a tab configured to selectively engage and disengage with the storage container to retain said plate to the storage container; and
- a movable locking member configured to selectively engage and disengage with the storage container, and wherein when engaged with the storage container said locking member inhibits said plate from moving relative to the storage container.

2. The plate of claim 1, wherein said plate is slidable relative to the storage container to engage said securing projection with the storage container.

3. The plate of claim 2, wherein said and said second surface define a space between one another configured to receive a portion of the storage container when said plate is slid relative to the storage container.

4. The plate of claim 3, wherein said attachment feature comprises a through hole configured to threadedly receive a fastener such that a distal end of the fastener extends further away from said second surface than said securing projection such that the fastener physically contacts the storage container to thereby increase tension engagement between said tab and the portion of the storage container located between said tab and said second surface.

5. The plate of claim 4, wherein said securing projection is a first securing projection, and said plate further comprises a plurality of securing projections including said first securing projection.

6. The plate of claim 1, wherein said attachment feature comprises a through hole.

7. The plate of claim 6, wherein said through hole comprises a cavity underlying said first surface and configured to receive a fastener to secure the fastener to said plate.

8. The plate of claim 1, wherein said attachment feature is a first attachment feature, and said plate further comprises a plurality of attachment features including said first attachment feature, and wherein said attachment features comprise cavities.

9. The plate of claim 8, wherein said cavities are hexagonal-shaped, and said plate further comprises outer walls defining said cavities and extending from said second surface to define a hexagonal grid of openings at said second surface.

10. The plate of claim 1, wherein said movable locking member is movable relative to said first surface between a locked position and an unlocked position, wherein said movable locking member comprises a protrusion that is configured to engage with the storage container when said movable locking member is in said locked position to inhibit said plate from moving relative to the storage container, and wherein said protrusion is configured to be disengaged from the storage container when said movable locking member is in said unlocked position to allow movement of said plate relative to the storage container.

11. The plate of claim 10, wherein said movable locking member further comprises a proximal end integrally connected to said plate, and a distal end terminating at or inboard of an outer perimeter of at least one of said first surface or said second surface.

12. The plate of claim 11, wherein said movable locking member further comprises a handle portion at said distal end, said handle portion defining an access cavity for manually flexing said movable locking member into said unlocked position.

13. The plate of claim 10, wherein said movable locking member is a resilient cantilevered member configured to be flexed between said locked and unlocked positions.

14. The plate of claim 1, wherein said plate is a unitary body.

15. A plate to which an object may be selectively secured, and configured to be selectively secured to an upper portion of a storage container, and with said plate comprising:

- a first surface comprising an upper surface located opposite a second surface comprising a lower surface;
- a plurality of attachment features for selectively securing the object to said plate;
- a plurality of securing projections extending from said second surface and comprising a plurality of tabs, respectively, configured to selectively engage and disengage with the storage container to retain said plate to the storage container; and
- a movable locking member configured to selectively engage and disengage with the storage container, and wherein when engaged with the storage container said locking member inhibits said plate from moving relative to the storage container.

16. The plate of claim 15, wherein said tabs and said second surface define a plurality of spaces, respectively, between one another configured to receive a portion of the storage container to engage said tabs with the storage container when said plate is slid relative to the storage container.

17. The plate of claim 16, wherein said plurality of attachment features each comprise a through hole and a cavity, wherein each of said cavities is configured to receive a threaded nut, and wherein a fastener is insertable through a respective one of said through holes to threadedly engage a respective one of the nuts.

18. The plate of claim 17, wherein said through holes are configured to threadedly receive fasteners such that a distal end of the fasteners extend further away from said second surface than said plurality of securing projections such that the fasteners physically contact the storage container to thereby increase the tension engagement between said tabs and the portion of the storage container located between said tab and said second surface.

19. A plate to which an object may be selectively secured, and with said plate configured to be selectively secured to an upper portion of a storage container, said plate comprising:

a first surface comprising an upper surface located opposite a second surface comprising a lower surface;

a plurality of attachment features for selectively securing the object to said plate;

a plurality of securing projections extending from said second surface and comprising a plurality of tabs, respectively, configured to selectively engage and disengage with the storage container to retain said plate to the storage container; and movable locking member that is movable relative to said first surface between a locked position and an unlocked position, and comprising a protrusion that is configured to engage with the storage container when said movable locking member is in said locked position to inhibit said plate from moving relative to the storage container, and wherein said protrusion is configured to be disengaged from the storage container when said movable locking member is in said unlocked position to allow movement of said plate relative to the storage container.

20. The plate of claim 19, wherein said plurality of attachment features each comprise a hexagonal-shaped cavity.

* * * * *